US007002892B2

(12) United States Patent  
Kitamura et al.

(10) Patent No.: US 7,002,892 B2  
(45) Date of Patent: Feb. 21, 2006

(54) OPTICAL PICKUP REPRODUCING APPARATUS HAVING READING COMPATIBILITY AMONG RECORDING MEDIA WITH RESPECTIVE RECORDING DENSITIES DIFFERENT FROM ONE ANOTHER

(75) Inventors: Atsushi Kitamura, Iwata-gun (JP); Kozo Matsumoto, Iwata-gun (JP); Motoji Egawa, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 355 days.

(21) Appl. No.: 10/184,984

(22) Filed: Jul. 1, 2002

(65) Prior Publication Data

US 2003/0007446 A1 Jan. 9, 2003

(30) Foreign Application Priority Data

Jul. 6, 2001 (JP) ............................. 2001-206256

(51) Int. Cl.  
*G11B 7/00* (2006.01)

(52) U.S. Cl. .......................... 369/112.02; 369/112.17; 369/112.22

(58) Field of Classification Search ........... 369/112.02, 369/112.17, 112.16, 112.01, 112.21, 112.19, 369/112.2, 112.22, 112.24

See application file for complete search history.

(56) References Cited

U.S. PATENT DOCUMENTS

| | | | | |
|---|---|---|---|---|
| 5,734,472 A | * | 3/1998 | Ito et al. ...................... | 356/364 |
| 6,049,518 A | * | 4/2000 | Tsuchiya et al. ........ | 369/112.02 |
| 6,160,783 A | * | 12/2000 | Tsuchiya et al. ........ | 369/112.02 |
| 6,243,326 B1 | * | 6/2001 | Sumi et al. ............... | 369/13.29 |
| 6,396,791 B1 | * | 5/2002 | Wakao et al. ........... | 369/112.29 |
| 6,518,555 B1 | * | 2/2003 | Kikuchi et al. ........... | 250/201.5 |
| 2002/0084405 A1 | * | 7/2002 | Matsumoto et al. ..... | 250/208.1 |

FOREIGN PATENT DOCUMENTS

| JP | A 10-241193 | 9/1998 |
|---|---|---|
| JP | A 11-3528 | 1/1999 |

* cited by examiner

Primary Examiner—William Klimowicz  
Assistant Examiner—Lixi Chow  
(74) Attorney, Agent, or Firm—Oliff & Berridge, PLC

(57) ABSTRACT

A liquid crystal element is provided as a polarization plane rotating device between a laser beam source and a beam splitter. Light emitted from the laser beam source passes through the liquid crystal element and the beam splitter, and is converted into parallel light by a collimating lens. The collimated light is incident on a first light-selection device, is reflected at a flat first reflecting surface or a concave second reflecting surface, and is then incident on a super-resolution cut-off filter as a second light-selection device. The light having passed through the second light-selection device is incident on an objective lens, and is converged onto a recording surface. The selection of the reflecting surface of the first light-selection device is determined based on an operation mode of the liquid crystal element.

10 Claims, 14 Drawing Sheets

OPTICAL PICKUP REPRODUCING APPARATUS HAVING READING COMPATIBILITY AMONG RECORDING MEDIA WITH RESPECTIVE RECORDING DENSITIES DIFFERENT FROM ONE ANOTHER

BACKGROUND OF THE INVENTION

1. Field of the Invention

The present invention relates to an optical pickup apparatus which can compatibly read, with one laser diode conventionally adapted for compact disks (center wavelength: 780 nm) only, information recorded in any of two types of recording media having respective recording densities different from each other.

2. Description of the Related Art

Currently, in information input/output apparatuses using light, such as a compact disk drive, a recording pit is formed by converging light emitted from a laser beam source as a micro spot on a track provided on a disk-shaped recording medium such as a compact disk (CD). The presence or absence of such a pit is recorded as information, and then the micro spot on the track is irradiated with light from the laser beam source to detect the presence or absence of the pit on the track by reflected light, thereby reading the information.

Recently, digital video disks (DVDs) having a recording capacity of about 7 times as large as that of CDs have been widely used to meet the demand for increased recording capacity. An increase in recording capacity involves improvement in recording density, which depends upon the number of recording pits that can be formed on a recording medium (hereinafter, referred to as an optical disk). In DVDs, decreasing the size of the recording pit, that is, decreasing the diameter of the spot of a light beam irradiated on the optical disk is one of factors in increasing the density. The size of the spot to be irradiated on the optical disk is proportional to the wavelength of the laser and is inversely proportional to the numerical aperture of an objective lens. Accordingly, for decreasing the size of the recording pit, it is required to decrease the wavelength of the laser and to increase the numerical aperture of the objective lens.

DVDs are strongly required to be compatible with CDs. Originally, an optical head device was equipped with one laser beam source having a wavelength of 635 to 650 nm and one objective lens having a numerical aperture of about 0.6 for DVDs, and also with another laser beam source having a wavelength of 780 nm and another objective lens having a numerical aperture of about 0.45 for CDs so as to ensure compatibility between DVDs and CDs.

However, when the numerical aperture of the objective lens increases, the convergence of light beam deteriorates due to coma aberration with respect to the tilt of the optical disk. Since coma aberration is proportional to the cube of the numerical aperture of the objective lens and to the thickness of the optical disk substrate, DVDs are designed to have a substrate thickness of 0.6 mm, which is equal to the half of CDs' substrate thickness.

When the thickness of the substrate deviates from a designed value, spherical aberration will occur at a place where light passing through the central portion of the objective lens and light passing through the outward portion thereof converge. Therefore, when a CD is read by the use of an objective lens having a numerical aperture optimally designed for a DVD's substrate thickness, it is necessary to correct spherical aberration by limiting the outermost flux of light incident on the objective lens or by slightly diverging the incident angle at the lens.

Accordingly, while one objective lens can work for both DVDs and CDs with the necessary correction of spherical aberration, two laser beam sources having respective wavelengths as described above have to be provided for compatibility with write-once-read-many CDs. This is because a reflective recording layer of write-once-read-many CDs is formed of an organic dye material and thus has a reflection coefficient as low as 6% for a light beam having a wavelength of 635 to 650 nm, that is a wavelength appropriate to DVDs.

Thus, since the current DVD optical head apparatuses are equipped with two laser beam sources respectively with a wavelength of 635 to 650 nm for DVDs and a wavelength of 780 nm for CDs, and since respective light beams emitted from the two light sources are to be guided to one objective lenses thereby requiring additional parts such as a prism, an aperture control device, or the like, it is very difficult to reduce the size and cost of the apparatus.

FIGS. 15A and 15B show an embodiment of a conventional optical pickup apparatus. FIG. 15A is for reading a high-density optical disk, as typified by a DVD, and FIG. 15B is for reading a standard-density optical disk, as typified by a CD.

As shown in FIG. 15A, a laser beam source 2 with a wavelength of 635 to 650 nm is used in order to support a high-density optical disk 1. First light emitted from the laser beam source 2 passes through a wavelength-selection prism 15 and a beam splitter 9, and is converted into parallel pencil by a collimating lens 14. The light in parallel pencil is incident on a first light-selection device 3 at an angle of 45°, and is totally reflected at a flat first reflecting surface 4 in a direction perpendicular to an objective lens 6. Then, the light is incident on the objective lens 6 whose numerical aperture is set for a high-density optical disk, and is converged onto a recording surface of the high-density optical disk 1 by the objective lens 6. The first reflecting surface 4 is flat and composed of a wavelength-selection film 30 formed of a dielectric multi-layer film.

On the other hand, as shown in FIG. 15B, a laser beam source 12 with a wavelength of 780 nm is used in order to support a standard-density optical disk 11. Second light emitted from the laser beam source 12 is reflected by a wavelength-selection prism 15 at an angle of 90°. Then, the reflected light is incident on the first reflecting surface 4 of the first light-selection device 3 at an angle of 45°, in a manner similar to the first light. At this time, the incident light passes through the first reflecting surface 4, and is reflected at a second reflecting surface 7. The second reflecting surface 7 is concaved, and a metal film 8 as a total-reflection film is formed thereon at the central circular area thereby controlling the beam diameter of the light coming through the flat surface. The other area of the concaved surface than the circular total-reflection film is covered by an anti-reflection film 16 so that light that is not reflected by the total-reflection film does not get astray.

The shape (not shown) of the metal film 8 is designed to be a substantially perfect circle seen from the optical axis, and its outside diameter is set such that light, when converged onto the standard-density optical disk 11 by the objective lens 6, produces an optimum beam diameter. Such a function of controlling the beam diameter of light incident on the objective lens 6 is called an aperture control function. The light coming through the flat surface side is totally reflected only at the metal film 8, which constitutes the second reflecting surface 7 on the concaved surface side, directed toward the objective lens 6, made incident thereon, and converged onto the standard-density optical disk 11. At this time, since the beam diameter is controlled by the aperture control function, the light is optimally converged onto the recording surface of the standard-density optical disk 11 by the objective lens 6.

As described above, in the conventional optical pickup apparatuses, spherical aberration, which is caused by the fact that the high-density optical disk substrate 1 has a thickness of 0.6 mm, whereas the standard-density optical disk substrate 11 has a thickness of 1.2 mm, is corrected, thereby converging light onto the recording surface of the standard-density optical disk 11. Specifically, the light is slightly diverged at the metal film 8 serving as the second reflecting surface 7 having curvature, thereby being converted into a pencil of rays slightly diverging to the objective lens 6. The direction of focusing is controlled by adjusting an actuator 17. The light reflected at the recording surface of either optical disk takes the incoming route backward, is made incident on a beam splitter 9 and directed thereby toward a cylindrical lens 10 to reach a photodetector 13, where the light is detected and gets the intensity of its signal light converted into an electrical signal, whereby recorded information is read.

Another embodiment of a conventional optical pickup apparatus shown in FIGS. 16A and 16B is disclosed in Japanese Patents Laid-open No. 10-241193 and No. 11-3528 by the inventors of the present invention, in which one laser beam source can support both a standard-density optical disk and a high-density optical disk. As shown in FIGS. 16A and 16B, the optical pickup apparatus uses only one laser beam source 20 with a wavelength of 635 to 650 nm for both a standard-density optical disk 11 and a high-density optical disk 1. Light emitted from the laser beam source 20 is transmitted with or without its polarization plane being rotated by a polarization plane rotating device 21. The light, when incident on a polarizing plate 23 provided ahead of an objective lens 22, is either blocked (FIG. 16B) by a filter portion 23A or passes (FIG. 16A) therethrough depending on the angle of the polarization plane.

Thus, the polarization plane rotating device 21 and the polarizing plate 23 enables the objective lens 22 to control a numerical aperture, thereby varying the diameter of the beam converged by the objective lens 22. The rotation of the polarization plane by the polarization plane rotating device 21 can be controlled by turning on and off a switch SW of a control circuit A thereby applying thereto a signal from the circuit A.

Since the optical pickup apparatus of FIGS. 15A and 15B needs two types of laser beam sources having different wavelengths from each other for a standard-density optical disk and a high-density optical disk, respectively, problems are involved in reducing cost and downsizing. Moreover, since the plano-concave lens serving as a reflection mirror has a function of controlling the aperture, three types of films: a wavelength filtering film; a total-reflection film; and an anti-reflection film must be formed, thus increasing cost and also giving technical difficulty.

The optical pickup apparatus of FIGS. 16A and 16B uses only one laser beam source with a wavelength of 635 to 650 nm for reading a high-density optical disk. When reading a standard-density optical disk, the polarizing plate 23, which is provided ahead of the objective lens 22 and adapted to block the periphery of light, transmits only the central portion of the laser beam by means of a polarizing filter, and light is converged to an appropriate spot diameter onto a recording surface.

However, as described above, the thickness of a substrate is different between the high-density optical, disk and the standard-density optical disk. Accordingly, the problem that spherical aberration occurs in a beam spot converged on the recording surface of the standard-density optical disk 11 cannot be solved, adversely affecting reading of recorded information. Furthermore, laser beam sources with a wavelength of 635 to 650 nm are more expensive than those with a wavelength of 780 nm failing to realize a substantial cost reduction, and also inferior thereto in reliability and output characteristics.

SUMMARY OF THE INVENTION

Accordingly, it is an object of the present invention to provide an optical pickup apparatus that is simple in construction and suitable for downsizing and lower profile, and that uses only one low-cost laser diode having a large oscillating wavelength (central wavelength: 780 nm) and still has reading compatibility among recording media such as DVDs, CDs, CD-R/RWs or the like, which have respective recording densities different from one another. Another object of the invention is to enable the apparatus to read high-density optical disks by disposing a super-resolution cut-off filter immediately ahead of an objective lens and allowing the filter to select polarized light for optical super-solution effect.

In order to achieve the above objects, in an optical pickup apparatus according to the present invention, light emitted from one laser beam source is incident on a polarization plane rotating means for enabling the rotation of a polarization plane. Light (S-polarized light or P-polarized light), whose polarization plane is controlled by the polarization plane rotating means, has its optical path separated by a first light-selection means composed of a reflection mirror formed of a plano-concave lens and adapted to selectively reflect the S or P-polarized light. Separated light is converted into a pencil of rays by a second light-selecting means according to two types of recording media having respective recording densities. The pencil of rays is converged onto a recording medium by an objective lens, and light reflected thereat is detected as a signal.

An optical pickup apparatus according to the present invention comprises: a laser beam source; a polarization plane rotating means adapted to rotate a polarization plane of light emitted from the laser beam source; a first light-selection means adapted to select light from the polarization plane rotating means according to the polarization plane of the light; a second light-selection means adapted to select light from the first light-selection means; an objective lens adapted to converge light from the second light-selection onto the surface of a recording medium of two types having respective recording densities; and a photodetctor adapted to detect light reflected from the recording medium.

In the optical pickup apparatus, preferably, the second light-selection means is disposed between the first light-selection means and the objective lens.

In the optical pickup apparatus, preferably, the first light-selection means includes a reflection mirror composed of a plano-concave lens whose flat side has a polarization filter film adapted to selectively transmit or reflect light according to the angle of the polarization plane of the light, and whose concave side has a reflection film adapted to reflect light irrespective of the angle of the polarization plane of the light.

In the optical pickup apparatus, preferably, the polarization filter film on the flat side of the plano-concave lens is formed of a dielectric multi-layer film, and the reflection film on the concave side thereof is formed of a metal film.

In the optical pickup apparatus, preferably, the second light-selection means is a super-resolution cut-off filter formed such that a polarization filter film of a dielectric multi-layer film is formed on a transparent substrate.

In the optical pickup apparatus, preferably, the polarization filter film on the flat side of the plano-concave lens and the polarization filter film of the super-resolution cut-off filter are formed of a dielectric multi-layer film and have the same light transmitting characteristics.

In the optical pickup apparatus, preferably, the polarization plane rotating means is a liquid crystal element.

In the optical pickup apparatus, preferably, the polarization plane rotating means is a Faraday element.

In the optical pickup apparatus, preferably, the polarization plane rotating means is a phase-retarder.

In the optical pickup apparatus, preferably, the phase-retarder is a $1/2\lambda$ phase-retarder formed of a birefringent crystal material.

In the optical pickup apparatus, preferably, the phase-retarder is a Soleil phase-retarder formed of an optically active substance.

In the optical pickup apparatus, preferably, the laser beam source has a central wavelength of 780 nm.

DESCRIPTION OF THE PREFERRED EMBODIMENTS

Figure 1A:
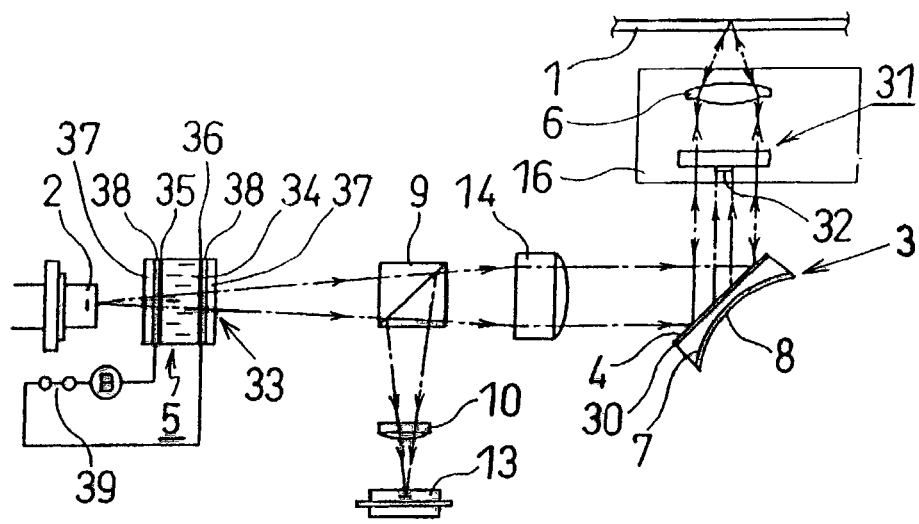
FIGS. 1A and 1B show a first embodiment of the present invention for a high-density optical disk mode and a standard-density optical disk mode, respectively.

An optical pickup apparatus of the present invention has a filter with super-resolution (super-resolution cut-off filter) disposed immediately ahead of an objective lens, whereby the apparatus is enabled to read micro-pit information on a recording medium with a high density, such as a DVD disk using only a laser diode (wavelength: 780 nm) conventionally adapted for CDs.

The super-resolution cut-off filter used for the invention is an optical filter for coherent light realized by using a super-resolution technology. The super-resolution technology is described in, for example, "Optical and Electro Optical Engineering Contact" Vol. 33, No. 11 (1995) and well known, and thus a description thereof will be omitted. An optical pickup apparatus according to an embodiment of the invention will be described with reference to the attached drawings. Elements same as those of the optical pickup apparatus described in the discussion of the related art are denoted by the same reference numerals and a description thereof will be omitted unless necessary.

Figure 1B:
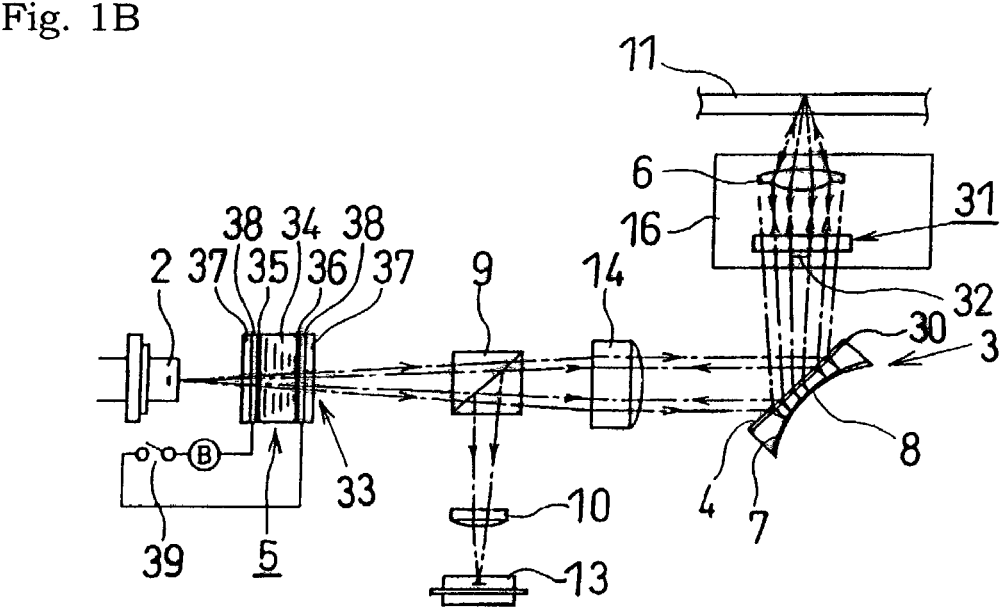

Referring to FIGS. 1A and 1B showing an optical pickup apparatus according to a first embodiment of the present invention, a liquid crystal rotating device 5, which uses a liquid crystal element 33 as a polarization plane rotating means for rotating the polarization plane of light emitted from the laser beam source 2, is disposed between a laser beam source 2 (central wavelength of emitted light: 780 nm) and a beam splitter 9.

The light emitted from the laser beam source 2 passes through the liquid crystal element 33 and the beam splitter 9, and is converted into parallel pencil of rays by a collimating lens 14. The collimated light is incident on a first light-selection means 3, has its optical path separated thereby according to the angle of its polarization plane, and is reflected in a prescribed direction. The light reflected by the first light-selection means 3 is incident on a second light-selection means 31 (super-resolution cut-off filter), is converted into a pencil of rays according to either of two types of recording media having respective recording densities different from each other, is incident on a objective lens 6, and is converged thereby onto a high-density optical disk 1 or a standard-density optical disk 11.

The polarization plane rotating means may not be limited to the liquid crystal element 33 as long as the polarization plane of the light emitted from the laser beam source can be rotated. For example, it may be a polarization plane rotating device using a plate-like phase-retarder formed of a birefringent crystal material, such as liquid crystal, mica or the like, processed so as to obtain a desired double refraction index (to be described later) of $180°$ (phase difference between two polarized light beams orthogonal to each other: $1/2\lambda$), or may be a Faraday rotating device constituted by a Faraday element predisposed to rotate a polarization plane P of linear polarization by effecting a magnetic field and a coil for applying an external magnetic field. Alternatively, it may be a polarization plane rotating device utilizing a phenomenon that the refraction index of a solid material is changed by the external electrical field (electro-optic effect).

The first light-selecting means is a reflection mirror formed of a plano-concave lens. A flat side of the plano-concave lens has a first reflecting surface 4 having a polarizing filter film adapted to selectively transmit or reflect light according to the angle of the polarization plane of the light. A concave side of the plano-concave lens has a second reflecting surface 7 having a reflection film adapted to reflect the light irrespective of the angle of the polarization plane of the light.

The light collimated by the collimating lens 14 is incident on the first light-selection means 3 at a designated angle, for example, 45° (an angle other than this is possible) and is reflected at the first reflecting surface 4 or the second reflecting surface 7 toward the objective lens 6, as will be described later. The second light-selection means 31 is disposed between the first light-selection device 3 and the objective lens 6. The light incident on the objective lens 6 is converged thereby onto the high-density optical disk 1 or the standard-density optical disk.

Figure 2A:
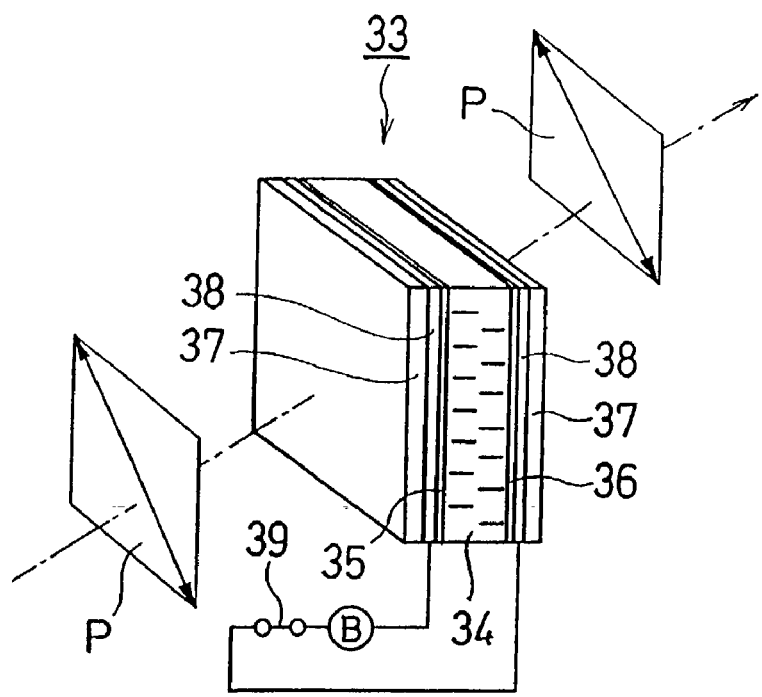
FIGS. 2A and 2B show the structure of a liquid crystal element, with a voltage being applied to a TN liquid crystal (FIG. 2A), and not (FIG. 2B).
Figure 2B:
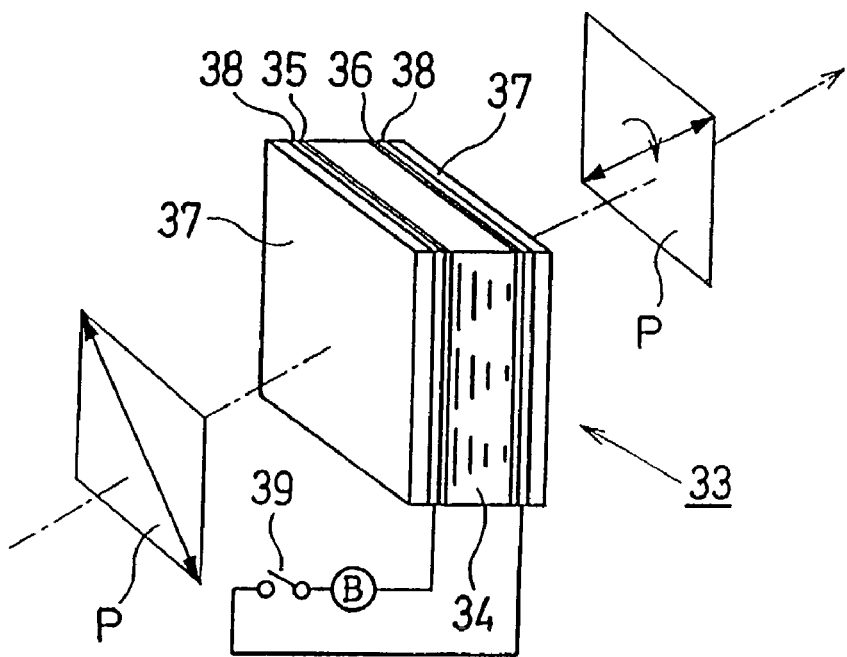

The liquid crystal element 33 of the liquid crystal rotating device 5 is configured as shown in FIGS. 2A and 2B. Specifically, the liquid crystal element 33 has directing films 35 and 36 inside respective transparent electrodes 38 formed inside respective transparent substrates 37, the directing films sandwiching a nematic liquid crystal 34 therebetween. The directing films 35 and 36 are configured such that a large number of grooves are formed in a macromolecular film applied on a glass substrate in one direction in advance with fibers such as nylon, and molecules of the liquid crystal are aligned along the grooves by a rubbing process. The two directing films 35 and 36 are subjected to the rubbing process in respective directions 90° different from each other. The molecules of the nematic liquid crystal 34 sandwiched between the two directing films 35 and 36 are equally influenced by the two directing films 35 and 36, whereby the molecules shaped like sticks wind spirally by 90 degrees to constitute twisted nematic (hereinafter, referred to as TN) liquid crystal.

The liquid crystal element 33 functions as follows: When a switch 39 is turned on thereby applying a voltage B of several volts to the transparent electrodes 38 provided inside the respective transparent substrates 37 of the TN liquid crystal as shown in FIG. 2A, most of the liquid crystal molecules are aligned along the direction of the magnetic field, which is called a homeotropic molecular alignment. Light incident on the TN liquid crystal passes through the liquid crystal element 33 without rotating the polarization plane.

When the applied voltage B is removed by turning off the switch 39, most of the liquid crystal molecules are twisted to be aligned along a direction perpendicular to the aforesaid alignment. In such a case, incident linear polarized light has its polarization plane gradually rotated with the twist of the liquid crystal molecules, and exits out as linear polarized light with its polarization plane rotated 90° from the incident light, as shown in FIG. 2B.

The first reflecting surface 4 of the first light-selection means 3 has a polarizing filter layer 30 of a dielectric multi-layer film produced by alternately evaporating $SiO_2$, $TiO_2$, and the like. The second reflecting surface 7 defines a designated curvature, and has a metal film 8 formed by evaporating aluminum, chromium, silver, or the like. Light incident on the first light-selection device 3, and passing through the polarizing filter layer 30 is reflected at the metal film 8 to be directed toward the objective lens 6 at an appropriate angle, as will be described later.

The second light-selection means 31, which is provided between the first light-selection means 3 and the objective lens 6, comprises a transparent substrate such as a parallel glass plate and a polarizing filter layer 32 of a circular dielectric multi-layer film formed by evaporating $SiO_2$, $TiO_2$, and the like on the transparent substrate. The polarizing filter layer 32 constitutes the second light-selection means 31 (super-resolution cut-off filter), and thus the diameter of a light spot converged by the objective lens 6 can be made smaller than an ordinary diffraction threshold, as will be described later. The polarizing filter layer 32 is formed of a dielectric multi-layer film having the same light transmitting characteristics as the polarizing filter layer 30. This gives an advantage that the films can be formed using the same manufacturing equipment (film formation equipment). However, since the polarizing filter layers 32 and 30 have respective angles of incident light (incidence angles) different from each other, the thickness of respective dielectric multi-layer films is set to a designated dimension according to respective incidence angles.

Figure 3:
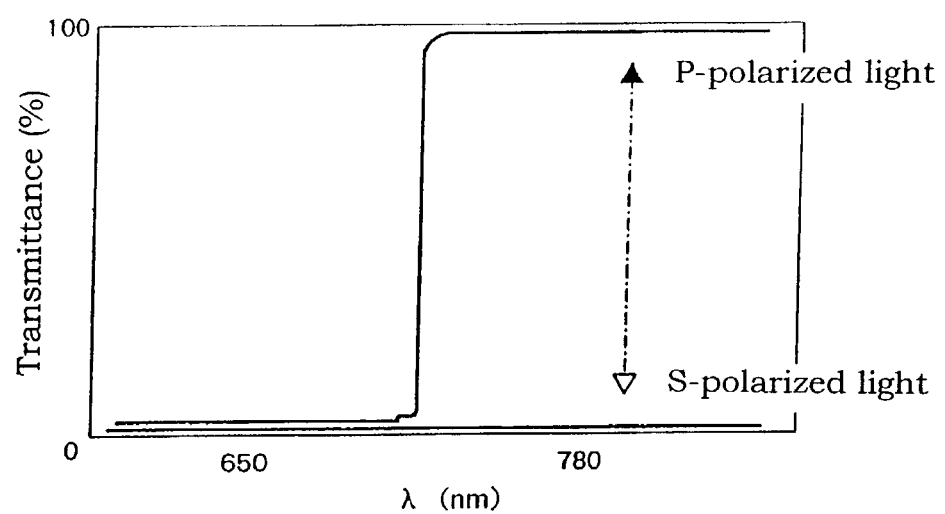
FIG. 3 shows light transmitting characteristics of polarization filter films constituting a reflecting surface and a super-resolution cut-off filter, respectively.

FIG. 3 shows the transmitting characteristics of the polarizing filter layers 30 and 32 constituting the first light-selection means 3 and the second light-selection means (super-resolution cut-off filter) 31, respectively. The horizontal axis indicates the wavelength of the light, and the vertical axis indicates the transmittance of the light. The polarizing filter layers 30 and 32 have transmittances of substantially 0% for S-polarized light from the laser beam source 2, and substantially 100% for P-polarized light at a wavelength of 780 nm as shown in FIG. 3.

Figure 4A:
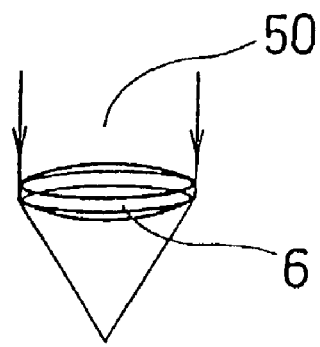
FIGS. 4A to 4D explain the change in the main lobe diameter of convergent spots when a laser beam is converged by the super-resolution cut-off filter.
Figure 4B:
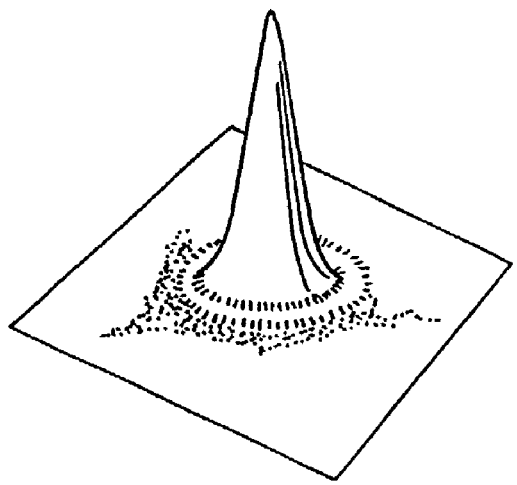
Figure 4C:
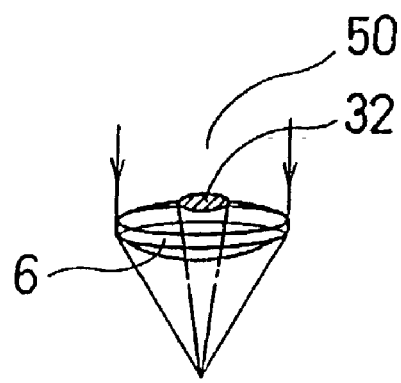
Figure 4D:
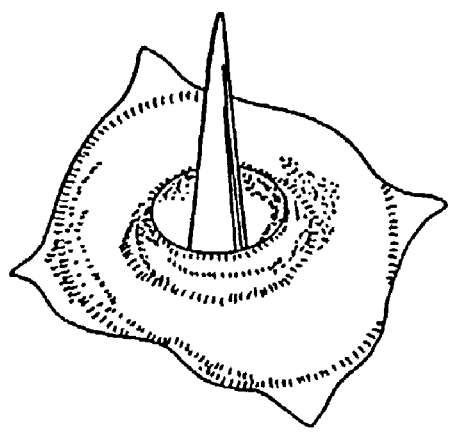

Referring to FIGS. 4A to 4D, the value of the main lobe diameter (not shown) is called a diffraction threshold spot diameter. The value is normally a possible minimum spot diameter, and exhibits a distribution shown in FIG. 4B when a laser beam 50 is incident on the objective lens 6 shown in FIG. 4A. However, when the laser beam 50 is blocked by the polarizing filter layer 32 placed immediately ahead of the objective lens 6 as shown in FIG. 4C, a distribution is such that an amplitude distribution within a lens aperture surface is smaller at the inward portion and larger at the outward portion as shown in FIG. 4D. Accordingly, the main lobe diameter of the focal spot can be made smaller than the normal diffraction threshold value.

Subsequently, optical paths of light emitted from the laser beam source 2 and finally optimally converged at the recording layer of the optical disk are described. First, an optical path taken when the high-density optical disk 1 is used is described. Referring to FIG. 1A, light emitted from the laser beam source 2 with a central wavelength of 780 nm is set to enter the liquid crystal element 33 as S-polarized light. A sensor (not shown) determines that the high-density optical disk 1 is used, and the switch 39 is turned on by a switching mechanism (not shown). When the switch 39 is turned on, a voltage B is applied to the transparent electrodes 38 of the liquid crystal element 33, and liquid crystal molecules are aligned in a direction of the electric field. Thus, the light passes through the liquid crystal element 33 without the polarization plane being rotated, then passes through the beam splitter 9, is converted into parallel pencil by the collimating lens 14, and is incident on the first light-selection means 3.

The first reflecting surface 4 of the first light-selection means 3 has the polarizing filter layer 30 formed thereon so that the S-polarized light emitted from the laser beam source 2 with a central wavelength of 780 nm is not transmitted therethrough but reflected thereat as shown in FIG. 3. Accordingly, the S-polarized light is entirely reflected toward the objective lens 6 to reach the super-resolution cut-off filter 31 that is the second light-selection means. The central portion of the S-polarized light is blocked by the polarizing filter layer 32 formed at the central portion of the super-resolution cut-off filter 31, and the other portion of the S-polarized light passes through the other portion of the super-resolution cut-off filter 31, which is made of glass and does not have the polarizing filter layer 32 formed thereon. Thus, the amplitude distribution within the lens aperture surface is smaller at the inward portion and larger at the outward portion as shown in FIG. 4D, and the light is converged onto the recording surface of the high-density optical disk with the main lobe diameter of the focal spot smaller than the normal diffraction threshold value.

Consequently, the information of the high-density optical disk can be read in an optimum spot diameter even with a laser beam source having a central wavelength of 780 nm. A final fine adjustment in a focusing direction is performed by an actuator 16 adapted to simultaneously move the objective lens 6 and the super-resolution cut-off filter 31 by a driving device (not shown).

Next, an optical path taken when the standard-density optical disk 11 is used is described. Referring to FIG. 1B, light emitted from the laser beam source 2 with a central wavelength of 780 nm is set to enter the liquid crystal element 33 as S-polarized light. The sensor (not shown) determines that the standard-density optical disk 11 is used, and the switch 39 is turned off by the switching mechanism (not shown).

When the switch 39 is turned off, a voltage B is not applied to the transparent electrodes 38 of the liquid crystal element 33, and most of liquid crystal molecules are twisted to be aligned in a direction perpendicular to the above-described alignment generated when the switch 39 is turned on for the high-density optical disk 1 mode. Accordingly, the S-polarized light incident on the liquid crystal element 33, while passing therethrough, has its polarization plane gradually rotated with the twist of the liquid crystal molecules to be finally rotated 90 degrees from the incident light, and exits out as P-polarized light orthogonal to the incident S-polarized light. The light having exited out the liquid crystal element 33 passes through the beam splitter 9, is converted into parallel pencil by the collimating lens 14, and is incident on the first light-selection means 3.

The first reflecting surface 4 of the first light-selection device 3 has the polarizing filter layer 30 formed thereon as shown in FIG. 3, and is adapted to pass P-polarized light of the laser beam source 2 with a central wavelength of 780 nm. Accordingly, the P-polarized light passes through the first reflecting surface 4 and is reflected at the metal film 8 constituting the second reflecting surface 7 toward the objective lens 6. The metal film 8 has a designated curvature, so that the P-polarized light is slightly diverged to be converted into a pencil of rays with a predetermined angle of dispersion.

Since the polarizing filter layer 32 of the super-resolution cut-off filter 31 and the polarizing filter layer 30 are each formed of a dielectric multi-layer film exhibiting the same light transmitting characteristics at the angle of incidence as described above, P-polarized light can pass therethrough as shown in FIG. 3. Also, since the substrate of the super-resolution cut-off filter 31 is made of glass, the pencil of rays of P-polarized light passes through the super-resolution cut-off filter 31 and is incident on the objective lens 6.

The reason why P-polarized light is converted into slightly divergent pencil of rays and is then incident on the objective lens 6 is as follows. The aspherical coefficient and the like of the objective lens 6 are optimally designed for the high-density optical disk 1. However, while the substrate of the high-density optical disk 1 has a thickness of 0.6 mm, the substrate of the standard-density optical disk 11 has a thickness of 1.2 mm. As a result, the position of convergence is different between the both optical disks, causing spherical aberration between a convergence position of the light passing through the center of the objective lens 6 and a convergence position of the light passing through the outward portion thereof. Therefore, the P-polarized light is slightly diverged and is made incident on the objective lens 6 as described above, whereby the light is converged onto the recording surface of the standard-density optical disk 11 without aberration.

Figure 5A:
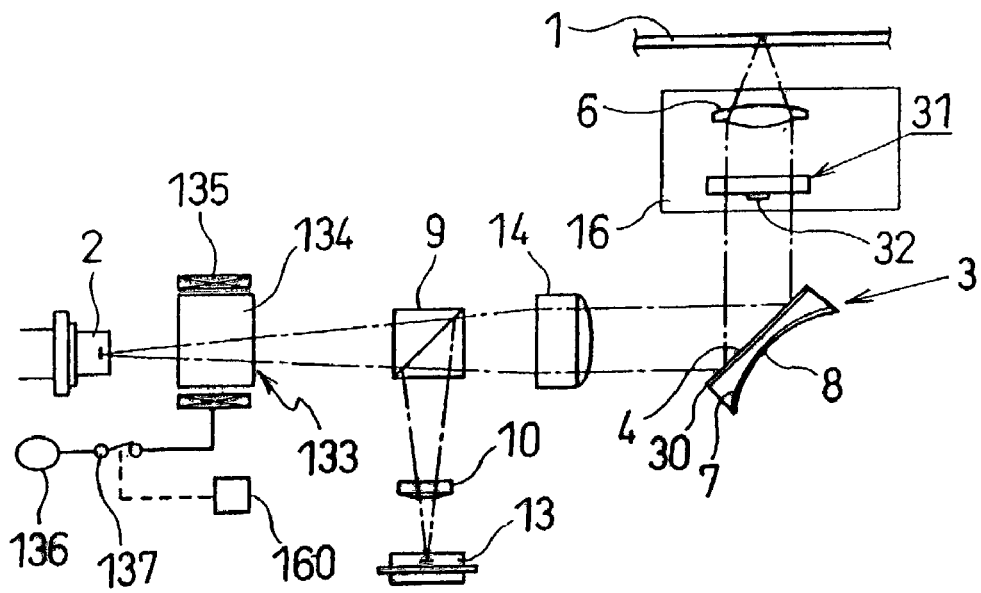
FIGS. 5A and 5B show a second embodiment of the present invention for a high-density optical disk mode and a standard-density optical disk mode, respectively.
Figure 5B:
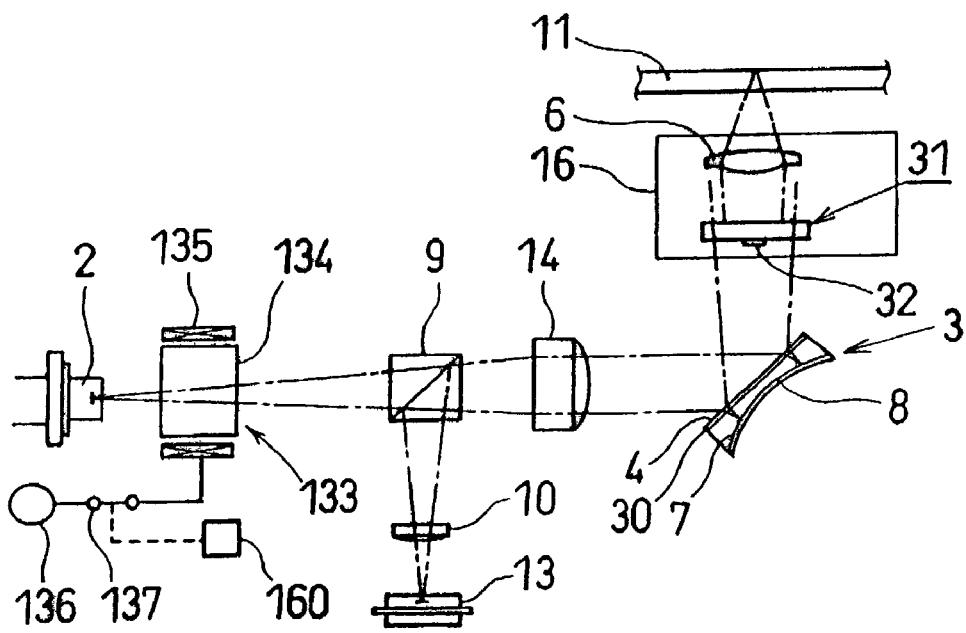

A second embodiment of the present invention will be described with reference to FIG. 5A through FIG. 8. As shown in FIGS. 5A and 5B, a Faraday rotator 133, which uses a Faraday element 134 as a polarization plane rotating means for rotating the polarization plane of light emitted from the laser beam source 2 (central wavelength of emitted light: 780 nm), is disposed between the laser beam source 2 and the beam splitter 9.

Since the optical paths in which light emitted from the laser beam source 2 is optimally converged onto the respective recording layers of the optical disks 1 and 11 are the same as those of the first embodiment, a description thereof will be omitted. Also, the same elements as those of the optical pickup apparatus explained in FIGS. 1A and 1B will be denoted by the same reference numerals, and a description thereof will be omitted, unless necessary.

Figure 6A:
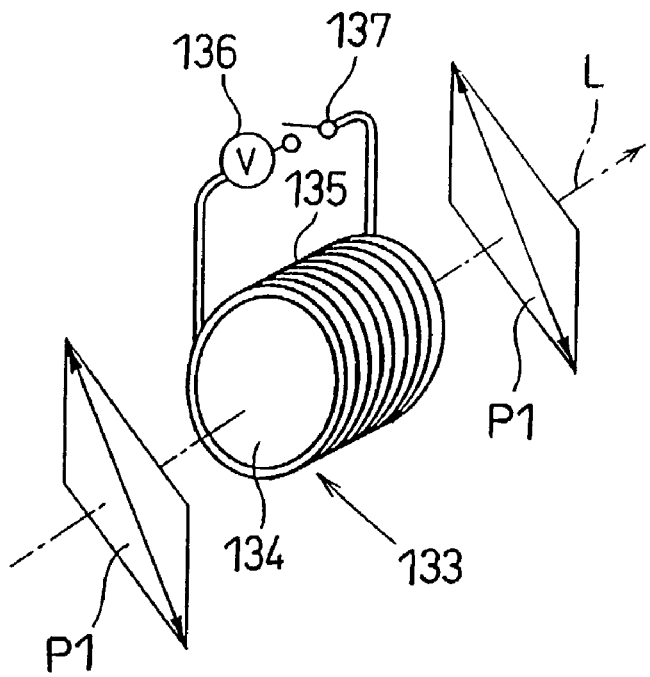
FIGS. 6A and 6B explain the function of a Faraday element, with an electric current being applied to a coil (FIG. 6B), and not (FIG. 6A).
Figure 6B:
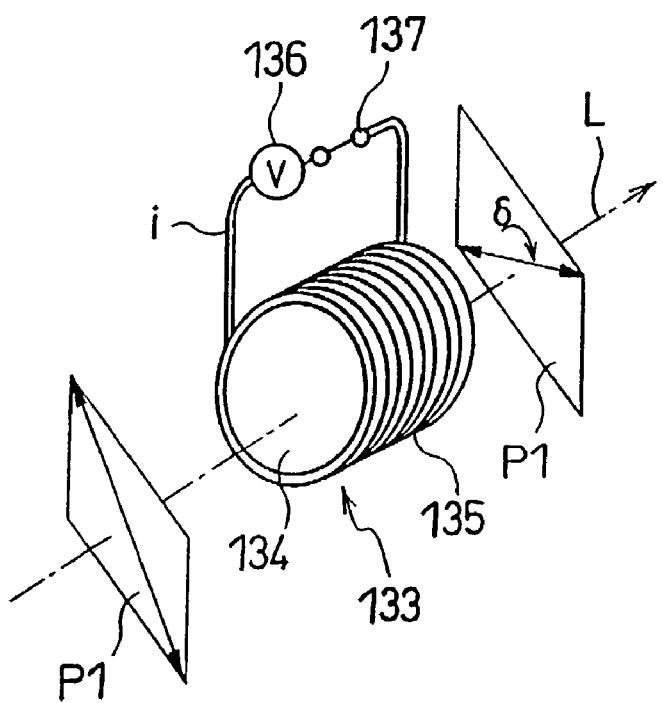

Referring to FIGS. 6A and 6B (where L is the direction of light), the Faraday rotator 133 includes, as well as the Faraday element 134, a coil 135 for applying an external magnetic field to the Faraday element 134. The Faraday element 134 is a material which has a property of rotating the polarization plane P1 of linear polarized light due to a magnetic field generated by applying an electric current (coil current) i to the coil 135. When an electric current is not applied to the coil 135, the polarization plane P1 is not rotated (FIG. 6A), and when an electric current is applied to the coil 135, the polarization plane P1 is rotated (FIG. 6B).

Figure 7:
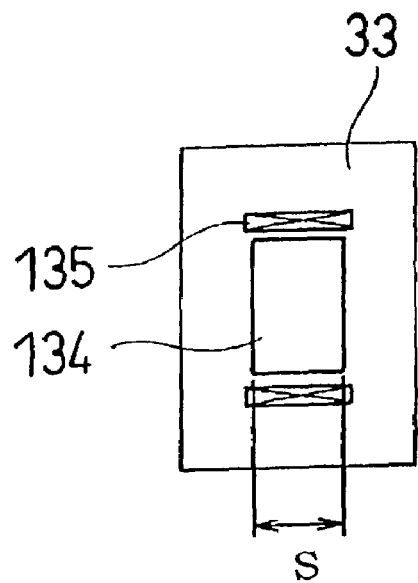
FIG. 7 is shows the traveling distance of light in the Faraday element.
Figure 8:
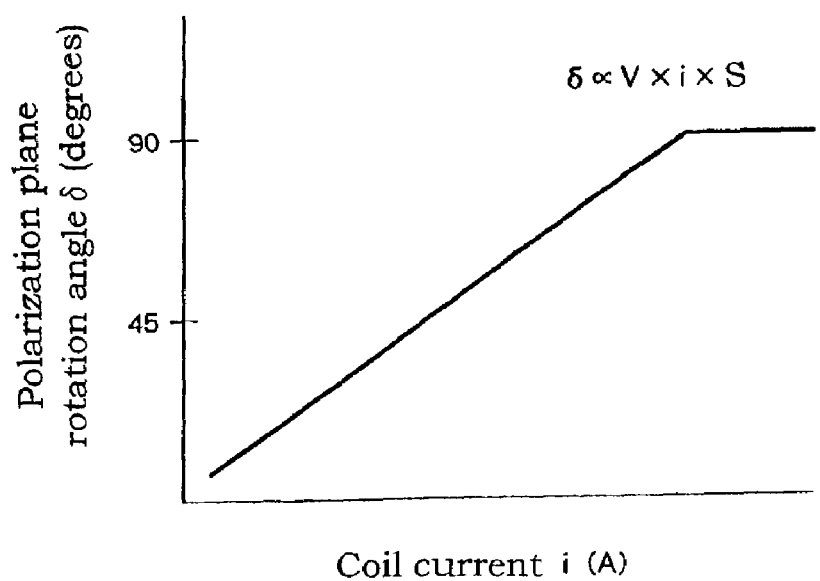
FIG. 8 is explains the relationship between the rotation angle of the polarization plane of light passing through the Faraday element and the intensity of a magnetic field.

Referring to FIGS. 7 and 8, the rotation angle (polarization plane rotation angle) δ of the polarization plane P1 of light after passing through the Faraday element 134 relative to that before passing therethrough is obtained by:

$$\delta = V \times H \times S$$

where V is Verdet's constant, H is the intensity of the magnetic field, and S is the traveling distance of light in the Faraday element 134. When the Faraday element 134 is of a ferromagnetic substance, internal spontaneous magnetization is saturated by applying a magnetic field with an intensity exceeding a certain value, and the polarization plane rotation angle δ per unit length is saturated to keep constant. Also, since the intensity H of the magnetic field is proportional to the coil current i, the relationship between the polarization plane rotation angle δ and the coil current i up to the saturation of the polarization plane rotation angle is expressed by:

$$\delta \propto V \times i \times S \text{ (see FIG. 8)}.$$

In general, the Faraday element 134 is made of rare-earth iron garnet. However, the material of the Faraday element 134 is not limited to rare-earth iron garnet, but may be Bi-substitutional rare-earth garnet, CdMnTe, or the like as long as it has a property shown in FIG. 8.

Returning to FIGS. 5A and 5B, a power source 136 for feeding an electric current to the coil 135 is connected to the Faraday rotator 133 via switch 137. A switching mechanism 160, which constitute a switching means together with the switch 137, is connected thereto. When the high-density optical disk 1 is placed in position on the optical pickup apparatus, the switching mechanism 160 turns off the switch 137 so as not to supply an electric current to the coil 135, thereby not allowing the rotation of the polarization plane of the light passing through the Faraday element 134. When the standard-density optical disk 11 is placed, the switch 137 is turned on to supply a desired electric current to the coil 135 for generating a magnetic field, thereby rotating the polarization plane of the light passing through the Faraday element 134 with a polarization plane rotation angle of 90°.

A third embodiment of the present invention will be described with reference to FIG. 9 through FIG. 12, in which a 1/2λ phase-retarder is used as a polarization plane rotating means for rotating the polarization plane of light emitted from the laser beam source 2 described in FIG. 1. Since the paths in which light emitted from the laser beam source 2 is optimally converged onto the respective recording layers of the optical disks 1 and 11 are the same as those of the first embodiment, a description thereof will be omitted. Also, the same elements as those of the optical pickup apparatus explained in FIGS. 1A and 1B will be denoted by the same reference numerals, and a description thereof will be omitted, unless necessary.

Figure 9:
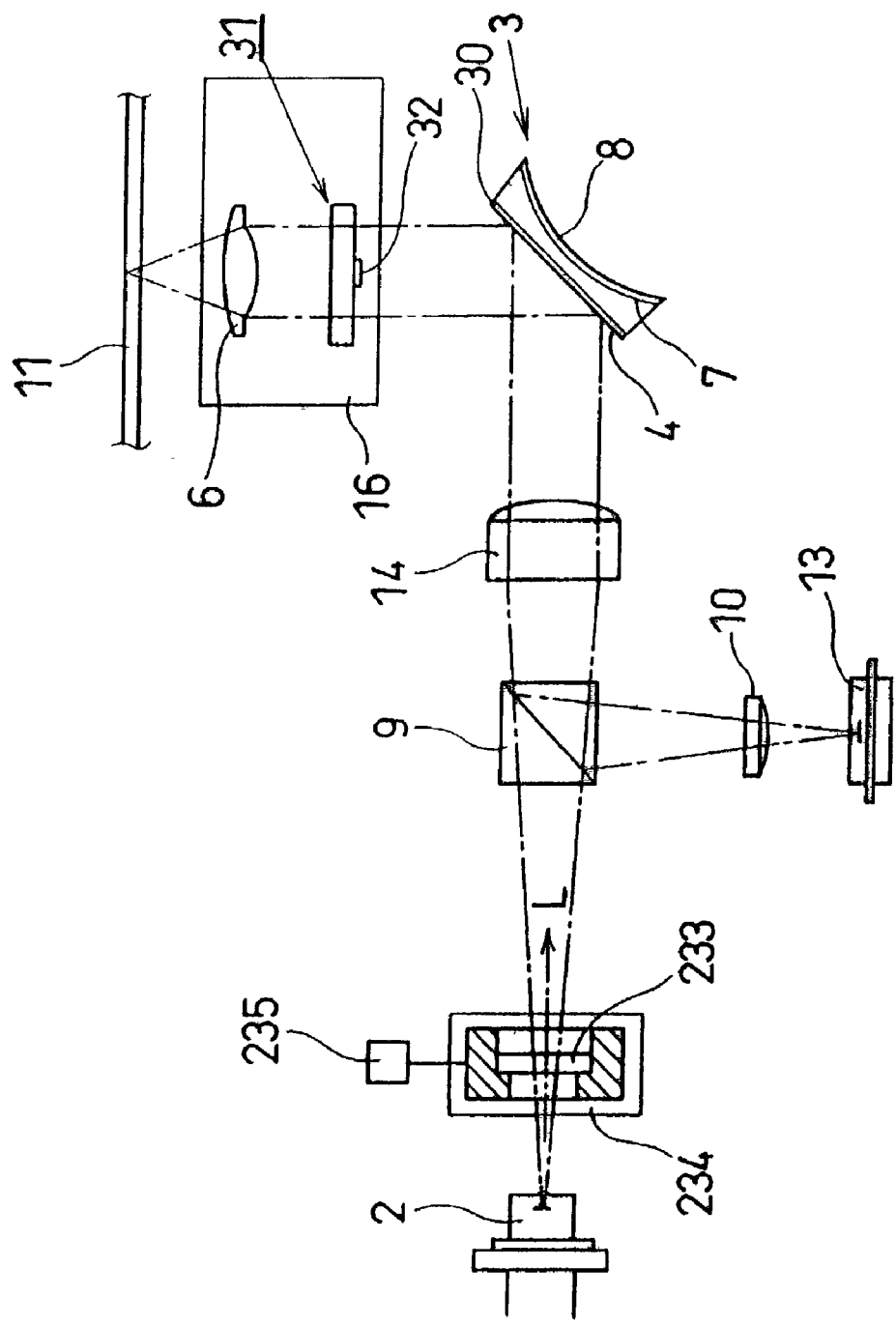
FIG. 9 is shows a third embodiment for a high-density optical disk mode.
Figure 10:
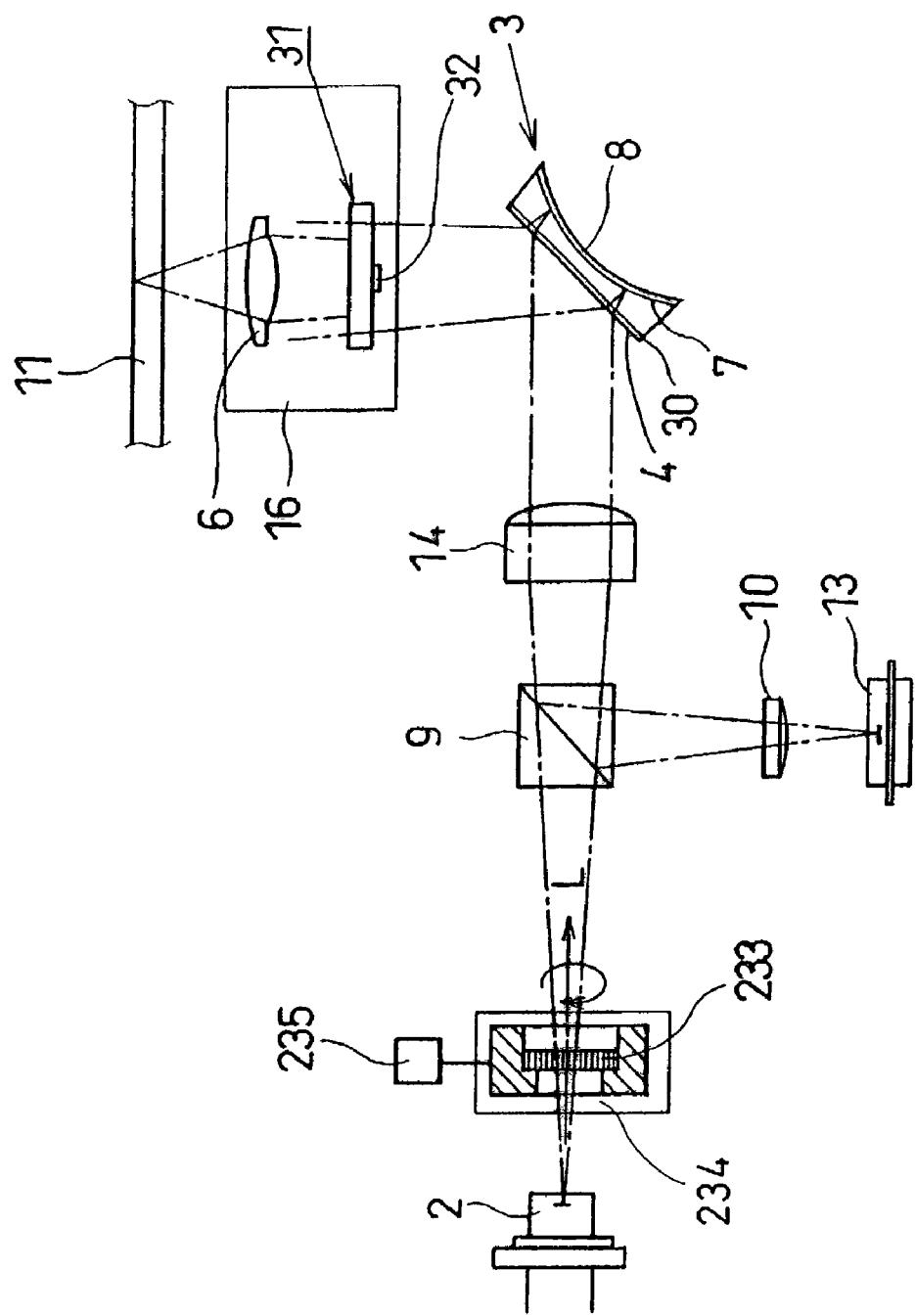
FIG. 10 shows a third embodiment for a standard-density optical disk mode.

As shown in FIGS. 9 and 10, a polarization rotating means 234 is disposed between the laser beam source 2 (central wavelength of the emitted light: 780 nm) and the beam splitter 9.

Figure 11A:
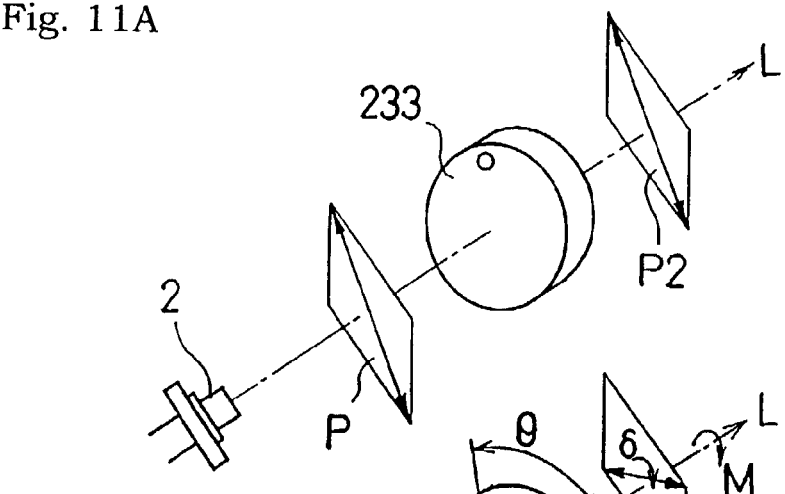
FIGS. 11A and 11B explain the function of a $1/2\lambda$ phase-retarder, with the rotation angle $\theta$ of the $1/2\lambda$ phase-retarder being $0°$ and $45°$, respectively.
Figure 11B:
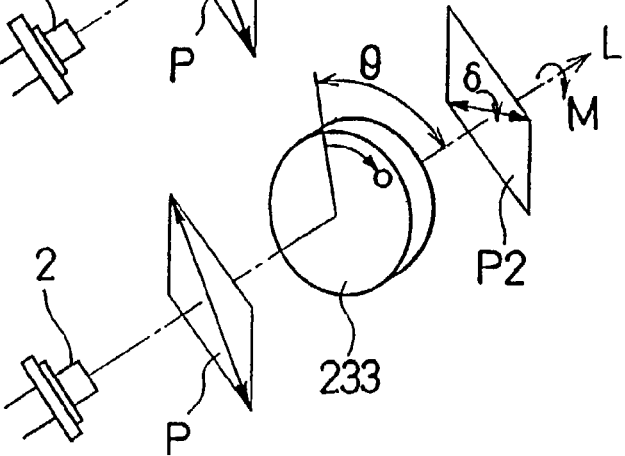

The polarization rotating means 234 can freely rotate a 1/2λ phase-retarder 233 provided therein, and also fix it at a designated angle. The 1/2λ phase-retarder 233 is shaped like a plate and formed of a birefringent crystal material such as rock crystal and mica worked to obtain a desired double refraction index of 180° (phase difference between two polarized light beams orthogonal to each other is 1/2λ). Referring to FIGS. 11A and 11B, the polarization plane rotating means 234 can, by means of a drive mechanism 235, rotate the 1/2λ phase-retarder 233 clockwise (in the direction shown by the arrow M) relative to the light direction (shown by the arrow L) by 45° (θ=45°: FIG. 11B), and rotate it back to its original position (θ=0°: FIG. 11A).

Figure 12:
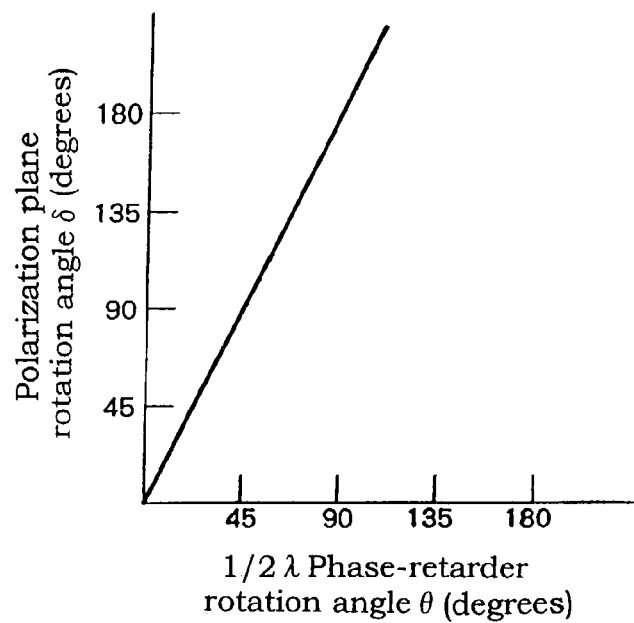
FIG. 12 shows the relationship between the rotation angle $\theta$ of the $1/2\lambda$ phase-retarder and the rotation angle $\delta$ of the polarization plane P of light having passed through the $1/2\lambda$ phase-retarder relative to the polarization plane P of light to be incident thereon.

P is the polarization plane of light emitted from the laser beam source 2, traveling in the direction L, and yet to reach the 1/2λ phase-retarder 233, P2 is the polarization plane of the light having passed therethrough, and δ° is the rotation angle of P2 relative to P. The rotation angle δ is proportional to the rotation angle θ of the 1/2λ phase-retarder 233 as shown in FIG. 12. Accordingly, assuming that the rotation angle θ of the 1/2λ phase-retarder 233 shown in FIG. 11A is 0°, and that the rotation angle θ of the 1/2λ phase-retarder 233 shown in FIG. 11B is 45°, the rotation angle δ of P2 is 90° from P. In other words, by rotating the 1/2λ phase-retarder 233 by an angle of 45°, linear polarized light incident on the 1/2λ phase-retarder 233 is converted into linear polarized light orthogonal to the incident light.

Figure 13:
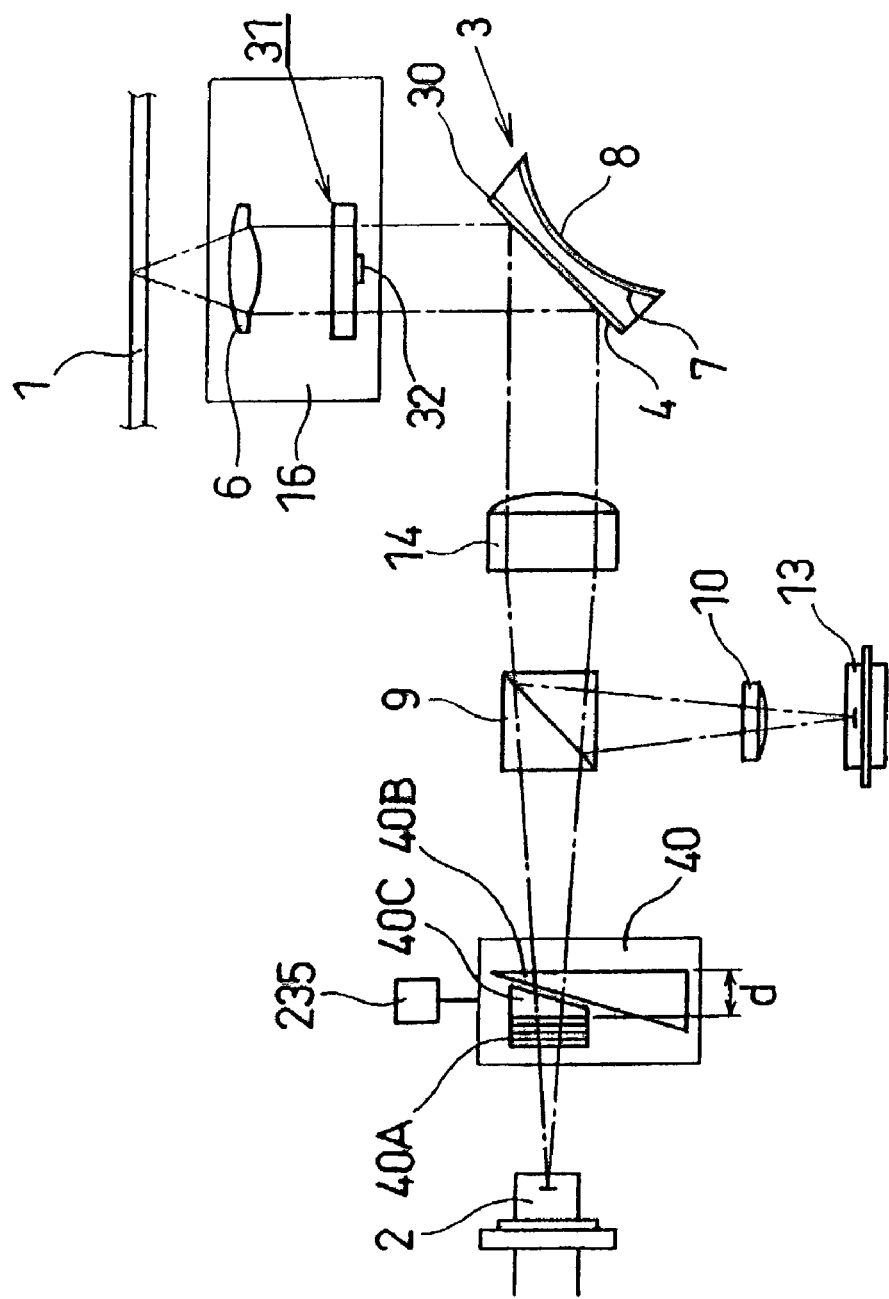
FIG. 13 shows a fourth embodiment for a high-density optical disk mode.
Figure 14:
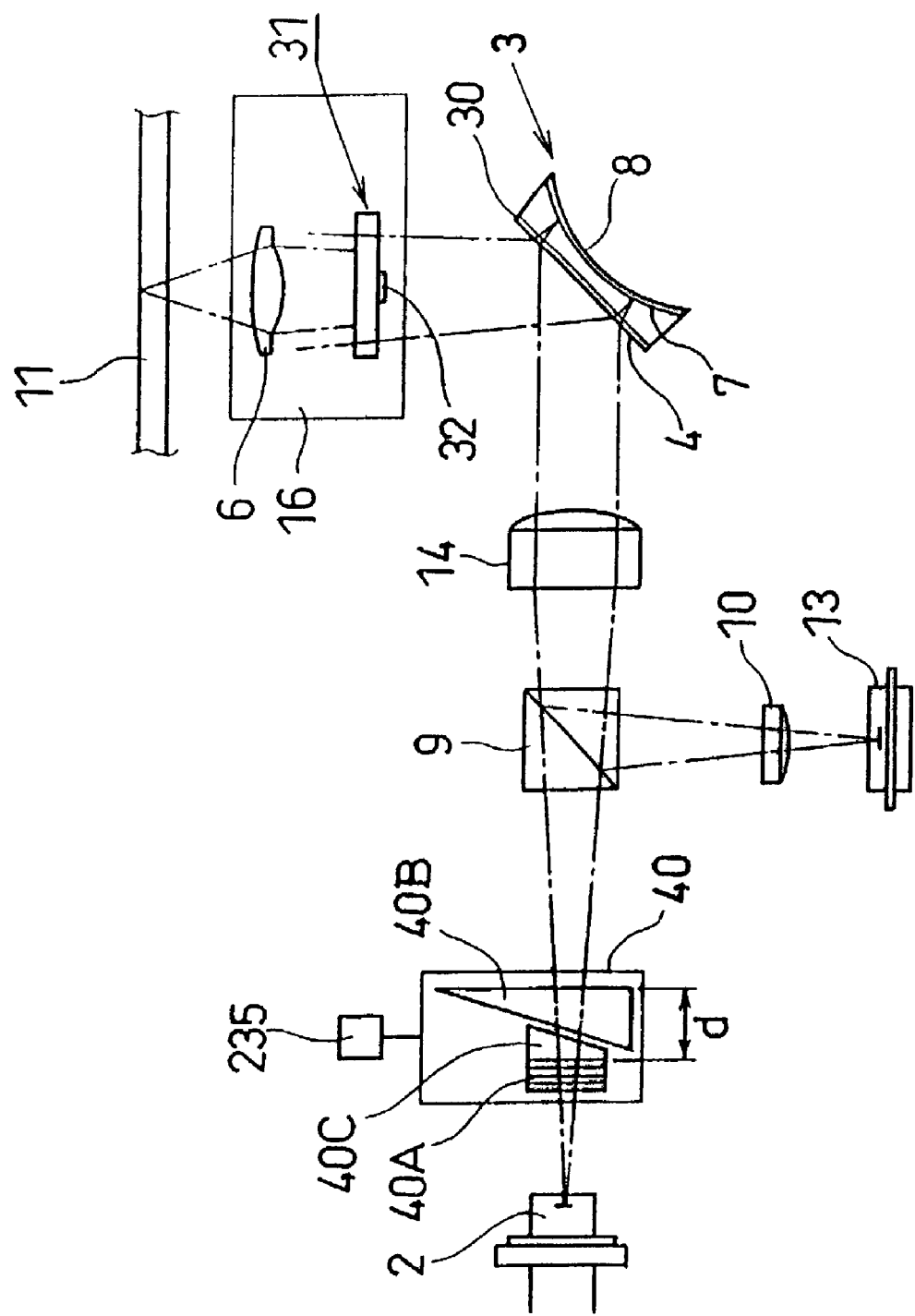
FIG. 14 shows a fourth embodiment for a standard-density optical disk mode.
Figure 15A:
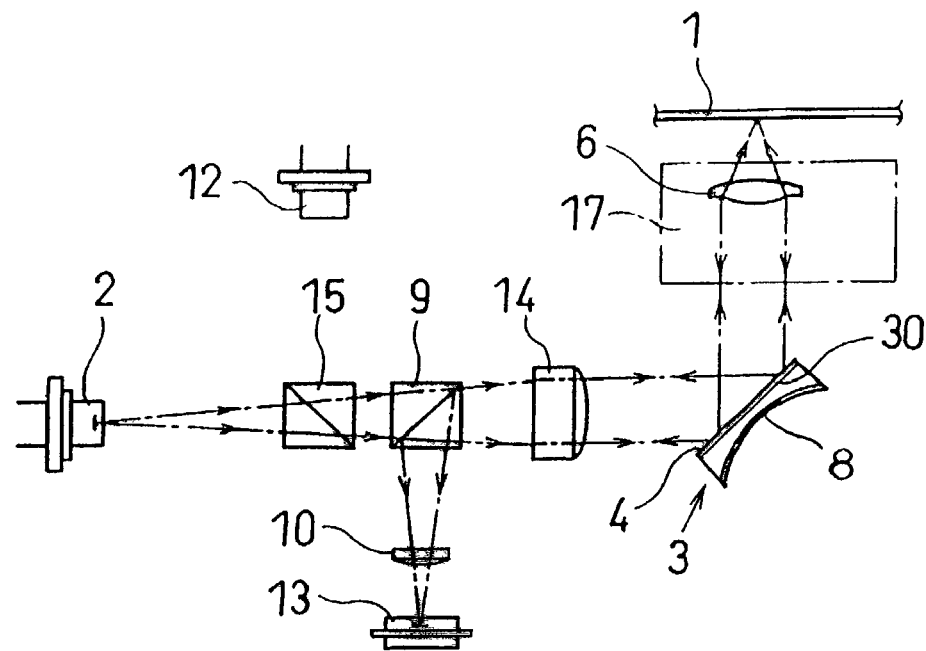
FIGS. 15A and 15B show an embodiment of a conventional optical pickup apparatus for a high-density optical disk mode and for a standard-density optical disk mode, respectively.
Figure 15B:
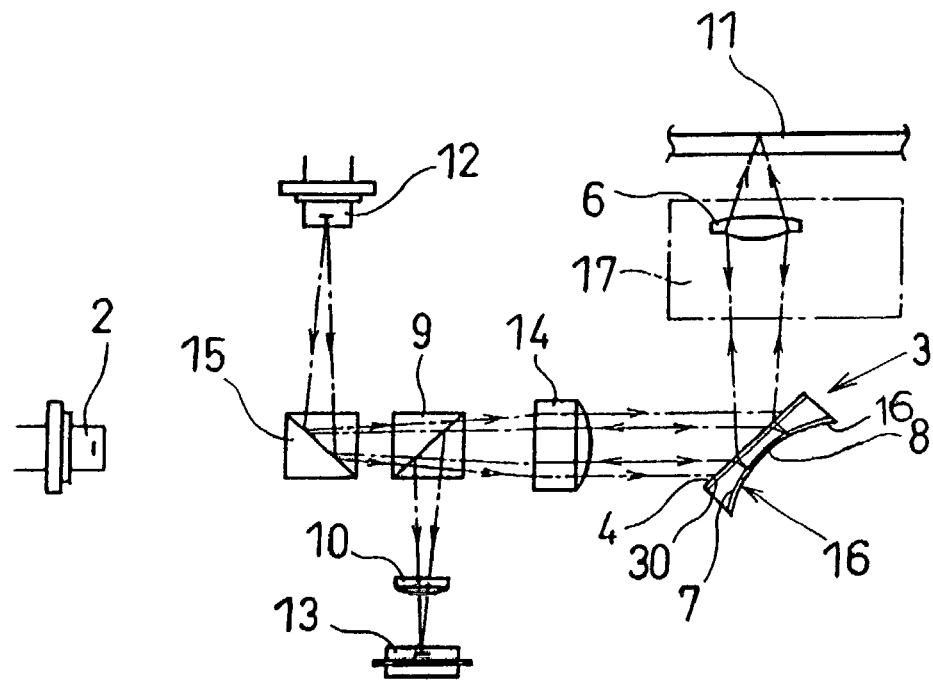
Figure 16A:
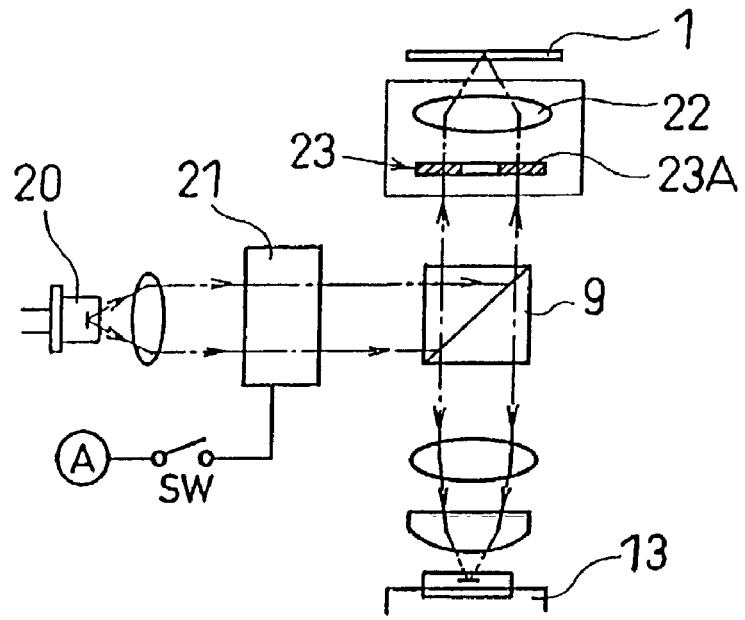
FIGS. 16A and 16B show another embodiment of a conventional optical pickup apparatus, indicating optical paths according to the angle of the polarization plane of light passing through a polarization filter, where light passes through the polarization filter (FIG. 16A), and is blocked thereby (FIG. 16B).
Figure 16B:
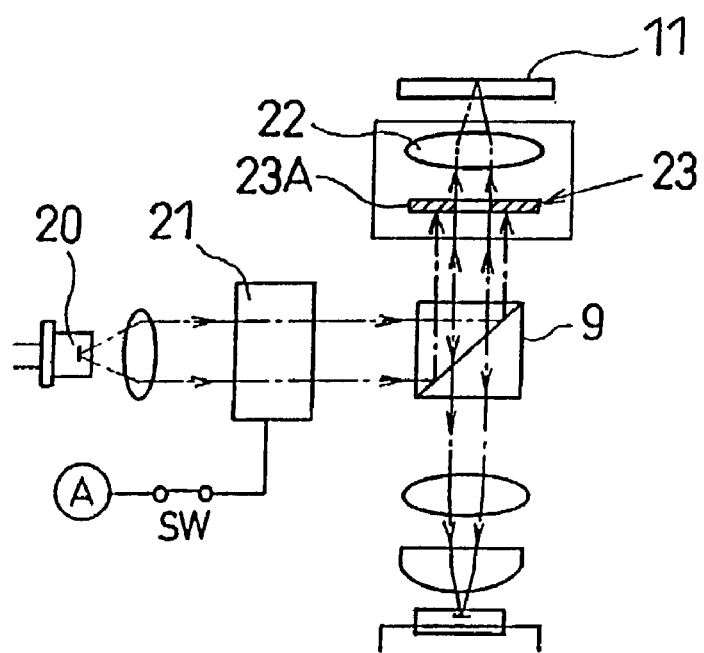

A fourth embodiment of the present invention will be described with reference to FIGS. 13 and 14. A Soleil phase-retarder is used as a polarization plane rotating means in place of the 1/2λ phase-retarder 233. Since the paths, in which light emitted from the laser beam source 2 is opti-mally converged onto the respective recording layers of the optical disks 1 and 11, are the same as those of the first embodiment, a description thereof will be omitted. Also, the same elements as those of the optical pickup apparatus explained in FIGS. 1A and 1B will be given the same reference numerals, and a description thereof will be omitted, unless necessary.

A Soleil phase-retarder 40 comprises typically a left lens 40A of a parallel plate shape and two right lenses 40B and 40C of a wedge shape, and is configured such that a practical thickness d of the two right lenses 40B and 40C combined (traveling distance of light passing through the two right lenses 40B and 40C) can be varied by vertically sliding the right lens 40B, thereby setting the polarization plane of the incident light to arbitrary angles (0° and 90° in this configuration). When reading the high-density optical disk 1, the right lens 40B is moved down as shown in FIG. 13. Accordingly, the practical thickness d of the right lens 40B decreases, so that light is transmitted without its polarization plane rotated. When reading the standard-density optical disk 11, the right lens 40B is moved up as shown in FIG. 14. Accordingly, the practical thickness d of the right lens 40B increases, so that light is transmitted with its polarization plane rotated.

The fourth embodiment uses the Soleil phase-retarder as a phase-retarder, but does not limit it to the Soleil phase-retarder, and one parallel plate lens may be used as long as the polarization plane of the incident light can be rotated 90° according to the thickness of the substrate of the optical disk. Also, the material of the Soleil phase-retarder is not limited to rock crystal, but may be substance exhibiting optical rotary power (optically active substance), for example liquid or gas. Furthermore, the face of a right triangular prism opposite to its right angle may be brought into tight contact with the polarization filter layer formed on the first reflecting surface of the reflection mirror in order to increase the phase accuracy of the optical path, the reliability of the film, and the like.

The optical pickup apparatus according to the invention works as follow. Light emitted from one laser beam source is incident on the polarization plane rotating means capable of rotating its polarization plane. The light coming from the polarization plane rotating means and having different polarization planes is separated by the first light-selection means including the reflection mirror composed of the plano-concave lens and adapted to selectively reflect S-polarized light or P-polarized light. The separated light is converted by the first light-selection means into a pencil of rays corresponding to one optical disk being read of the two types having respective recording densities. The pencil of rays is converged onto the optical disk by the objective lens, and the light reflected thereat is detected as a signal. Thus, despite the optical pickup apparatus having only one laser beam source that is inexpensive, and that is excellent in output characteristics and reliability, and having only one objective lens with no moving parts, light can be converged with a spot diameter appropriate for whichever optical disk having high-density or standard-density and without aberration, and the problems associated with the prior art are solved.

In the optical pickup apparatus, the second light-selection means is disposed between the objective lens and the first light-selection means. Consequently, a pencil of rays having the angle of divergence according to any of the two optical disks having respective recording densities can be easily selected.

In the optical pickup apparatus, the first light-selection means includes the reflection mirror composed of the plano-concave lens whose flat side has the polarization filter layer adapted to selectively transmit or reflect the light according to the angle of polarization plane of light, and whose concave side has the reflection film adapted to reflect the light irrespective of the angle of the polarization plane of the light. Accordingly, light having polarization planes of both P-polarized light and S-polarized light can be reflected by one reflection mirror and also the angle of divergence can be controlled, thereby achieving high cost performance.

In the optical pickup apparatus, the second light-selection means is a super-resolution cut-off filter configured such that a polarization filter layer of a dielectric multi-layer film is formed at the center of a light incident surface or a light exit surface of a parallel glass plate. Consequently, the optical film placed on the super-resolution cut-off filter does not require phase compensation, and therefore can be formed inexpensively and structured simply, thereby realizing cost reduction.

In the optical pickup apparatus, the polarization filter layer on the flat side of the plano-concave lens in the first light-selection means and the polarization filter layer of the super-resolution cut-off filter are formed of a dielectric multi-layer film having the same light transmitting characteristics. Accordingly, both the reflection mirror and the super-resolution cut-off means can be produced using the same manufacturing equipment, thus saving investment in equipments, and accordingly providing a low-cost optical pickup apparatus.

In the optical pickup apparatus, the polarization plane of the light emitted from the laser beam source can be easily rotated, and two types of optical disks having respective recording densities can be duly read thanks to the first and second light-selection means.

In the optical pickup apparatus, one laser beam source with a central wavelength of 780 nm is used, thereby achieving cost-effectiveness, and also excellent output characteristics and reliability.

What is claimed is:

1. An optical pickup apparatus, comprising:
   a laser beam source;
   a polarization plane rotating means adapted to rotate a polarization plane of light emitted from the laser beam source;
   a first light-selection means adapted to select light from the polarization plane rotating means according to a polarization plane of the light, the first light-selection means includes a reflection mirror composed of a plano-concave lens whose flat side has a polarization filter film adapted to selectively transmit or reflect light according to an angle of the polarization plane of the light, and whose concave side has a reflection film adapted to reflect the light irrespective of the angle of the polarization plane of the light;
   a second light-selection means adapted to select light from the first light-selection means, the second light-selection means is a super-resolution cut-off filter configured such that a polarization filter film of a dielectric multi-layer film is formed on a transparent substrate;
   an objective lens adapted to converge light from the second light-selection means onto a surface of a recording medium of two types having respective recording densities; and
   a photodetector adapted to detect light reflected from the recording medium, wherein
   the laser beam source is applicable to a wavelength only suitable for a recording medium of less recording density between the two types of recording medium.

2. The optical pickup apparatus according to claim 1, wherein the second light-selection means is disposed between the first light-selection means and the objective lens.

3. The optical pickup apparatus according to claim 1, wherein the polarization filter film on the flat side of the plano-concave lens is formed of a dielectric multi-layer film, and the reflection film on the concave side thereof is formed of a metal film.

4. The optical pickup apparatus according to claim 1, wherein the polarization filter film on the flat side of the plano-concave lens and the polarization filter film of a super-resolution cut-off filter are formed of a dielectric multi-layer film and have same light transmitting characteristics.

5. The optical pickup apparatus according to claim 1, wherein the polarization plane rotating means is a liquid crystal element.

6. The optical pickup apparatus according to claim 1, wherein the polarization plane rotating means is a Faraday element.

7. The optical pickup apparatus according to claim 1, wherein the polarization plane rotating means is a phase-retarder.

8. The optical pickup apparatus according to claim 7, wherein the phase-retarder is a 1/21 phase-retarder formed of a birefringent crystal material.

9. The optical pickup apparatus according to claim 7, wherein the phase-retarder is a Soleil phase-retarder formed of an optically active substance.

10. The optical pickup apparatus according to claim 1, wherein the laser beam source has a central wavelength of 780 nm.

* * * * *